3,767,744
PROCESS FOR DECREASING THE MINIMUM RESIDENCE TIME DURING THE MOLDING OF FOAMED POLYSTYRENE ARTICLES
Norbert Holl, Ludwigshafen, Germany, assignor to Badische Anilin- & Soda-Fabrik Aktiengesellschaft, Ludwigshafen am Rhine, Germany
No Drawing. Filed Feb. 16, 1971, Ser. No. 115,630
Claims priority, application Germany, Feb. 21, 1970, P 20 08 126.9
Int. Cl. B29c 25/00; B29d 27/00
U.S. Cl. 264—51                                  3 Claims

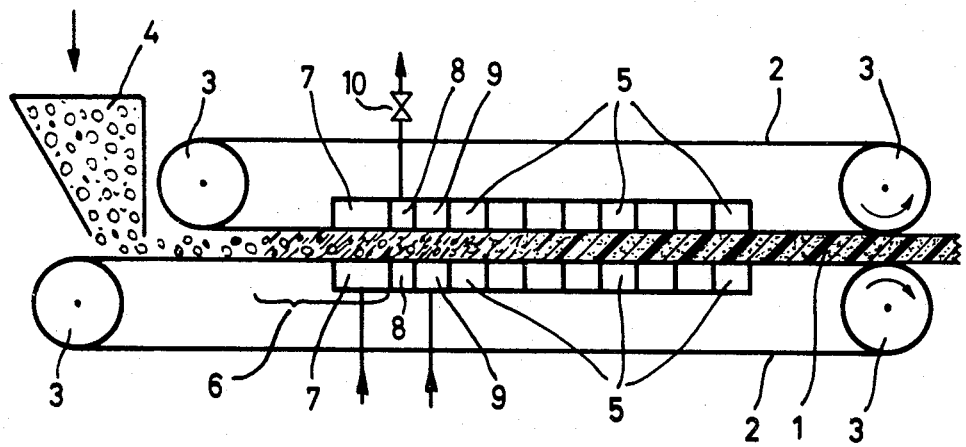

ABSTRACT OF THE DISCLOSURE

A method of decreasing the minimum residence time in the mold in the manufacture of articles of foamed polystyrene, by pressuring air into the mold. Prefoamed polystyrene particles are introduced into double-walled molds or channels having perforated walls. Steam at a pressure of from 0.5–1.2 atmospheres gauge is then introduced into the molds or channels to foam and coalesce the particles together. Subsequently, a gas (preferably air) initially at a pressure of 0.2 to 1.5 atmospheres gauge is into mold or channel and steadily reduced to 0 to 0.2 atmosphere gauge. The product is then removed from the mold or channel.

---

This invention relates to a process for the continuous or batchwise manufacture of foam articles of styrene polymers, in which the minimum residence time in the mold is shortened.

Polystyrene foams are usually formed from prefoamed polystyrene particles, i.e. particles which have been partly foamed but still contain expanding agent and are thus capable of further expansion, the procedure comprising placing the particles in double-walled molds having perforated inner walls and introducing steam at a pressure of from 0.5 to 1.2 atmospheres gauge for a short period to complete foaming, i.e. to cause further expansion of the particles coupled with sintering of the particles under the action of the internal expanison pressure. The foam must then remain in the mold until the expansion pressure, produced by steam, expanding agent and air, and equal to the pressure of the foam on the mold walls, has dropped and the temperature has fallen to such an extent that the molding retains its shape when removed from the mold. The minimum time required for this operation is referred to as the "minimum residence time in the mold". During steaming and cooling there is a fairly marked displacement of material toward the wall of the mold." During steaming and cooling there is a fairly which hinders the excess pressure which has built up in the foam from dropping and thus causes relatively long residence times in the mold.

The minimum residence time in the mold has a decisive influence on the rate of production of a given installation. Technicians are thus highly interested in keeping the minimum residence in the mold as short as possible. Furthermore, it is generally desirable to achieve as uniform a density distribution as possible within the foam articles, as otherwise boards cut from blocks of foam, for example, may be of varying quality.

It is thus an object of the present invention to provide a process for the manufacture of foam articles having as uniform a desnity distribution as possible with minimum residence time in the mold which are as short as possible.

We have now found that this object can be achieved by placing prefoamed but still expandable thermoplastic styrene polymer particles in non-gas tight molds or (for continuous operation) channels which are double-walled on at least two sides, having perforated inner walls, and causing said particles to foam to completion by heating them with steam to temperatures above the softening point of the styrene polymer and then, in the period of pressure reduction following the heating stage, passing a gas (preferably air) into the mold or channel under a pressure which is initially between 0.2 and 1.5 atmospheres gauge and which is steadily reduced up to the point where the molding is removed from the mold, at which point it is from 0 to 0.2 atmosphere gauge, the said pressure and the falling expansion pressure of the foam being correlated as far as possible.

One would have supposed that the expansion pressure could have been caused to drop more quickly by applying a vacuum, i.e. by exhausting the vapors and the air from the interior of the foam. Such methods have already been proposed. One would have thus have expected that the application of pressure from outside would increase the minimum residence time in the mold. In fact, however, the contrary takes place; the gas or air pressure applied from outside prevents the foam being pressed against the walls of the mold and thus allows the steam to leave the molding freely, so that cooling and the fall in the expansion pressure are accelerated. Furthermore, the direct transfer of heat from the hot wall of the mold to the foam is reduced because they are not in direct contact with one another. For this reason and also because of the rapid reduction of the steam pressure, the formation of a rind is less pronounced and a more uniform density of the shaped foamed article is achieved, and the diffusion of steam through the less impervious rind or surface zone is further facilitated.

The gas applied under pressure may be any gas which is inert to the plastics material and to the machine under the foaming conditions. Air is preferred.

The process is suitable for the manufacture of blocks of foam but may also be used for the manufacture of shaped articles in automatic machines. After the steam has been shut off, the air (or other gas) is pressured in to the steam chambers (outer chambers of the double-walled mold) which communicate with the mold cavity through the perforations in the inner walls of the mold. The process of the invention is particularly advantageous in the case of the continuous production of foam webs, which is known per se. In this case, steam and gas (air) are pressured into separate chambers which the foam web passes one after the other.

In either case (batchwise or continuous manufacture) it is not enough to inject the gas for one short period only since it will in practice escape relatively quickly due to leaks which are always present in the mold (which is indeed desirable for the removal of the steam and blowing agent vapor escaping from the foam). It is therefore necessary to maintain the pressure of the injected gas. Although the gas pressure in the mold should as far as possible be the same as the expansion pressure of the foam at all times, i.e., it should be at least approximately equal thereto, the permissible deviations above and below being not more than 50% and preferably less than 10%, actual values thus being between 0.2 and 1.5, preferably between 0.5 and 1.0, atmosphere gauge, the necessary gas pressure in the feed lines will, however, be higher, in some cases substantially higher, owing to the dimensions of the feed lines and to the fact that the mold is not gastight. However, the pressure in the feed lines is usually not above 5 atmospheres gauge.

The reduced minimum residence times in the mold achieved by the process of the invention are between 1 and 10 minutes, preferably between 2 and 6 minutes, in the case of continuous operation and between 5 and 50 minutes, preferably between 5 and 30 minutes, in batchwise operation.

The principle of the continuous process and the associated apparatus is described below with reference to the accompanying drawing, which is a diagrammatic vertical section through the machine. The main part of the machine is the channel 1, through which the foam travels. Its upper and lower walls are each formed by a perforated metal belt 2 passing over guide rollers 3. These belts could be replaced by movable plates or the like, it being merely essential that the walls are movable.

The side walls may also be movable or, preferably, stationary. In the latter case, they should be narrow in relation to the movable walls and their surfaces facing the foam should be smooth in order to minimize friction between them and the foam. They may be shaped so as to provide the foam with a profile at its side, for example tongue and groove profiles. It will be appreciated that the system can be rotated through 90° about its longitudinal axis such that the movable walls 2 become the side walls and the preferably stationary narrow walls of the channel are the top and bottom walls of the channel.

The belts travel past pressure chambers 9 and 5 disposed above and below the said belts, each pair of opposite chambers being interconnected. The belts thus close the open sides of the pressure chambers facing the channel 1, though they do not form a gastight seal between the chambers and the channel. The size and number of the pressure chambers 5 provided in a continuous series immediately downstream of the chamber 9 may be varied within wide limits to suit various factors and purposes.

The preexpanded polymer particles are changed into the feed hopper 4 and are carried through the machine by the moving belts 2. Steam is passed into the chamber 7 under pressure and passes through the perforated belts to the channel 1, where it flows counter-currently to the direction of travel of the polymer particles within the pressure build-up zone 6. This causes further foaming of the particles, which then sinter together, thus forming a barrier for the steam which therefore cannot escape in the direction of the feed hopper 4. A web of foam is thus formed which, on account of the expansion pressure within the particles, becomes wedges between the traveling belts and is thus transported in a forward direction by the said belts. It then passes the chamber 8, which is connected to a relief valve 10. The relief valve is set at a somewhat lower pressure than that prevailing in the previous chamber or in the following chamber 9. This avoids any direct mixing (except through the foam itself) of the steam with the gas injected into the chamber 9.

Gas, preferably air, is fed to the chamber 9 under a pressure which is the same as that of the steam supplied to chamber 7, for example 0.8 atmosphere gauge. Sealing means provided between the chambers 8 and 9 prevent the gas or air from escaping toward the chamber 8, except for slight losses due to leakage which then escape through the relief valve 10, and the said gas or air can thus only escape in the direction of travel of the belts and the foam after passing all of the pressure chambers 5. A pressure gradient from the chamber 9 to the final chamber 5 is automatically set up. Since the perforated belts pass the partitions between the chambers loosely, that is to say with no sealing means between the belts and the partitions, the belts are either pressed against the partitions or forced away from them depending on the ratio of the air pressure to the expansion pressure of the foam. When the belts are held away from the partitions, gas escapes and thus the gas pressure falls until it is equal to the expansion pressure of the foam. Thus the foam acts as a regulating valve and ensures that the gas pressure is always equal to the expansion pressure. Due to cooling and diffusion processes, this pressure falls gradually toward the final chamber.

The cushion of air which forms in the gaps between the belts and the partitions and also in the gaps between the belts and the longitudinal guide rails which are advantageously provided for guiding the belts but are not shown in the accompanying drawing for the sake of clarity, reduces the frictional forces and consequently the tension in the belts. This simplifies the design of the machine.

However, this also lead to a reduction in the friction between the foam and the traveling channel walls. This is undesirable inasmuch as the foam must be entrained by, and transported at the same speed as, the moving channel walls. To enable pressure to build up in the zone 6, the foam present in the second half of the channel must be able to exert an appropriate counter-pressure, and this necessitates a certain minimum friction between the foam and the travelling walls. For this reason, the pressure chambers 5 do not extend to the end of the channel 1. In the zone downstream of the final chamber 5 the gas or air can escape through the perforations in the moving walls with the result that the foam will bear against the moving walls over the final portion of the channel. The length of this final portion of the channel free from the cushion of air or gas will be adjusted according to the pressure which it is desired to build up in the zone 6.

Preexpanded but still expandable particulate styrene polymers are usually obtained by the suspension polymerization of monomers in the presence of expanding agents and heating the resulting granules having diameters of from 0.1 to 6 mm. and containing from 3 to 8% by weight of expanding agent, with the aid of steam while stirring. Steaming may be carried out under a pressure of up to about 1 atmosphere gauge, in which case it takes less than 1 minute, whereas steaming takes up to 5 minutes when atmospheric pressure is used. The thus prefoamed styrene polymers are in the form of beads having diameters of from 0.3 to 20 mm. and bulk densities of from 10 to 50 g./l. They may, if desired, be stored for up to a few days in the presence of air before further treatment comprising renewed heating for a short period to complete foaming either (batchwise) in molds which are closed on all sides but are not gastight or (continuously) in a channel which is closed on four sides but which is open at one or both ends, in order to produce foam articles and foam webs respectively having densities in the range 10 to 50 g./l.

However, the process of the invention is equally suitable for processing prefoamed but still expandable particulate styrene polymers obtained by a conventional method other than that described above. For example, particulate styrene polymers, such as beads having diameters of from 2 to 6 mm. and obtained by some suitable method, may be stored in contact with expanding agents and thus impregnated therewith. After preexpansion, such beads may have diameters of up to 3 cm. The method of producing the prefoamed but expandable particulate styrene polymers and their shape, density, expanding agent content and particle size are of no significance in the process of the invention, provided that they are free-flowing and still capable of expansion.

By styrene polymers we mean polystyrene and copolymers of styrene containing at least 50%, preferably at least 70%, by weight of polymerized units of styrene. Suitable comonomers are ethylenically unsaturated copolymerizable compounds such as α-methylstyrene, styrenes halogenated in the nucleus, styrenes alkylated in the nucleus and containing from 1 to 4 carbon atoms in the alkyl group, acrylonitrile, methacrylonitrile esters of acrylic, methacrylic and fumaric acids with alcohols of from 1 to 10 carbon atoms, butadiene, and N-vinyl compounds such as N-vinyl carbazole, N-vinyl pyridine and small amounts (less than 0.5% by weight) of divinyl compounds such as butanediol diacrylate or divinyl benzene.

The styrene polymers also include impact-resistant styrene polymers such as are produced by the polymerization of styrene or mixture of styrene with other ethylenically unsaturated copolymerizable monomers in the presence of particulate, preferably copolymerizable elastomers containing double bonds.

The molecular weight of the styrene polymers, expressed in terms of the K value (according to H. Fikentscher "Cellulosechemie," vol. 13 (1932), p. 58), is between 50 and 70 in the case of commercially useful products. Styrene polymers having K values below 50 possess poor mechanical properties and those with K values above 70 are difficult to process, which means in the present case that they only yield foams of relatively high density when subjected to the usual foaming conditions.

During both prefoaming and final foaming the styrene polymers are heated to temperatures just above their softening point. This is necessary to effect expansion. The polymers may soften only and must not melt. The softening point may be determined according German standard specification No. 57,302 (according to Vicat). In the case of the styrene polymers usually used in the process of the invention, the softening point is usually between 90° and 115° C.

Suitable expanding agents are liquids which boil below the softening point of the styrene polymers but which are non-solvents for the polymers and can be uniformly distributed throughout the polymer. We prefer to use the hydrocarbons normally employed for this purpose, such as butane, pentane, hexane, ligroin and halohydrocarbons such as methyl chloride, difluordichloromethane, difluoromethane, 1,2,2-trifluoro-1,1,2-trichloroethane, 1,1,1-trifluoroethane, ethyl fluoride or mixtures thereof.

It will be appreciated that the prefoamed styrene polymer particles may also contain other additives such as dyes, fillers, stabilizers and flame retardants, of which the last-named may be composed of a number of constituents, for example halogen compounds, particularly bromine compounds, in conjunction with synergistic additives.

EXAMPLE 1

Polystyrene granules having a diameter of from 1 to 2 mm. and containing about 6% by weight of pentane as expanding agent are prefoamed in a conventional continuous apparatus to give a product having a bulk density of 20 g./l. The product is stored for 24 hours and then foamed to completion in mold having the internal dimension 100 x 50 x 25 cm. to give tow blocks. The final foaming conditions (steam chamber pressure 0.6 atmosphere gauge; steaming period 30 seconds) are the same in each case.

Block 1 is produced in a conventional manner, i.e. with no subsequent air feed. Block 2, however, is produced in the manner according to the present invention, i.e. by introducing air into the mold at a pressure of 0.7 atmosphere gauge immediately after steaming. The air pressure is reduced to 0.05 atmosphere gauge in the course of 11 minutes, corresponding to the expected drop in the expansion pressure of the foam. The fall in expansion pressure may be determined in a simple experiment on a block which is not subjected to pressure, for example by installing a manometer in the wall of the mold.

Differences are found in the density distribution. In the case of block 1 the extreme values ranges from 21 kg./cm.$^3$ at the surface to 15.2 kg./m.$^3$ in the middle. In the case of block 2 the extreme values range from 19.3 to 17.5 kg./m.$^3$. Thus the densities found within a single block cover a range which is less than ⅓ of the range found in blocks produced in a conventional manner.

Differences are also found in the minimum residence times in the mold. In the case of block 1 this is about 16 minutes, whereas it is only 11 minutes in the case of block 2. The minimum residence time in the mold (or pressure reduction period) is defined as the time, measured from the end of steaming, it takes the expansion pressure to reach 0.05 atmosphere gauge.

EXAMPLE 2

A machine for the continuous manufacture of webs of polystyrene foam is used as illustrated in the accompanying drawing and having the following dimensions:

Total length of channel 1 _____ m__ 8.2
Length of pressure reduction zone (including chambers 9 and 5 and the free zone) _____ m__ 5.1
Height of channel (i.e. thickness of foam produced) _____ cm__ 3
Width of channel _____ cm__ 50

The linear speed of the belts is 3 m./min., the steam pressure in the steam chamber 7 is 0.6 atmosphere gauge, the relief valve 10 is set at 0.55 atmosphere gauge and the air pressure in the first pressure chamber 9 is 0.7 atmosphere gauge. The polystyrene beads having a bulk density of 15 g./l. are constantly replenished via the feed hopper 4. The resulting web of polystyrene foam is dimensionally stable and the particles are firmly fused together. The web is cut up into pieces of the desired length by means of a heated wire travelling with the web.

Comparable machines of conventional design, i.e. machines not incorporating pressure chambers 9 and 5, are far more expensive to build since the belts must withstand the total expansion pressure, and they require more supervision and maintenance. At given dimensions their output is only about ⅔ of that of the machine of the invention.

I claim:

1. A process for the continuous or batchwise manufacture of foam articles from preexpanded but still expandable particulate styrene polymers by heating the latter with steam to temperatures above the softening point of the styrene polymer in non-gastight molds or channels which have double walls on at least two sides, the inner walls being perforated, wherein an inert gas is pressured into the outer chambers of the double-walled mold or channel which communicate with the mold cavity through the perforations in the inner wall of the mold during the period of pressure reduction following heating, the pressure of said gas being initially from 0.2 to 1.5 atmospheres gauge and thereafter being steadily reduced until the molding is removed from the mold or channel, at which point the said pressure is from 0 to 0.2 atmosphere gauge, the said pressure and the falling expansion pressure of the foam being correlated in such a way that the pressure in the mold and the expansion pressure of the foam at all times are at least approximately equal, the permissible deviations above and below being not more than 50%.

2. A process for the manufacture of foam artciles as claimed in claim 1 wherein the gas pressured into the mold or channel is air.

3. A process as described in claim 1 wherein the pressure of the gas is initially from 0.5 to 1.0 atmosphere gauge.

(References on following page)

References Cited

UNITED STATES PATENTS

| | | | |
|---|---|---|---|
| 2,135,763 | 11/1938 | Nicholson | 264—DIG. 50 |
| 2,387,886 | 10/1945 | Devol | 264—DIG. 50 |
| 3,094,744 | 6/1963 | Renoux | 264—DIG. 50 |
| 3,408,690 | 11/1968 | Jacob | 264—53 UX |
| 3,594,461 | 7/1971 | Jacob | 264—51 |
| 3,383,441 | 5/1968 | Norrhede et al. | 264—51 |
| 3,427,372 | 2/1969 | Berner | 264—51 |
| 3,501,558 | 3/1970 | Munters et al. | 264—47 |
| 3,003,190 | 10/1961 | Macks | 264—88 |
| 3,126,432 | 3/1964 | Schuur | 264—DIG. 15 |
| 2,590,757 | 3/1952 | Cornelius et al. | 264—124 X |
| 3,121,760 | 2/1964 | Kline | 264—88 X |
| 3,647,329 | 3/1972 | Reifenhauser et al. | 425—4 C |

PHILIP E. ANDERSON, Primary Examiner

U.S. Cl. X.R.

260—2.5 B; 264—53, 88, 237, 348, DIG. 5; 425—4 C, 224, 817

UNITED STATES PATENT OFFICE
CERTIFICATE OF CORRECTION

Patent No. 3,767,744  Dated October 23, 1973

Inventor(s) Norbert Holl

It is certified that error appears in the above-identified patent and that said Letters Patent are hereby corrected as shown below:

Column 1, line 25, "atmosphere" should read -- atmospheres --.

Column 1, line 52, "mold."During steaming and cooling there is fairly" should read -- mold to form a dense "ring" at the surface of the foam--.

Column 2, line 3, "desnity" should read -- density --.

Column 3, line 48, "changed" should read -- charged --.

Column 4, line 31, "travelling" should read -- traveling --.

Column 6, line 23, "--m-- 8.2" should read -- 8.2 m --.

Column 6, line 25, "--m-- 5.1" should read -- 5.1 m --.

Column 6, line 27, "--cm -- 3" should read -- 3 cm --.

Column 6, line 28, "--cm-- 50" should read -- 50 cm --.

Signed and sealed this 29th day of October 1974.

(SEAL)
Attest:

McCOY M. GIBSON JR.
Attesting Officer

C. MARSHALL DANN
Commissioner of Patents